United States Patent
Shimizu et al.

(10) Patent No.: US 8,085,454 B2
(45) Date of Patent: Dec. 27, 2011

(54) MIRROR DEVICE DRIVE CONTROL APPARATUS AND PROJECTOR

(75) Inventors: Takeshi Shimizu, Chino (JP); Daisuke Ishida, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/169,479

(22) Filed: Jun. 27, 2011

(65) Prior Publication Data
US 2011/0255139 A1   Oct. 20, 2011

Related U.S. Application Data

(63) Continuation of application No. 12/749,549, filed on Mar. 30, 2010, now Pat. No. 7,990,596.

(30) Foreign Application Priority Data

Apr. 1, 2009   (JP) ................. 2009-088718
Feb. 18, 2010   (JP) ................. 2010-033236

(51) Int. Cl.
*G02B 26/08* (2006.01)
(52) U.S. Cl. ............... 359/199.1; 359/198.1; 359/199.3; 359/213.1; 359/214.1
(58) Field of Classification Search .... 359/198.1–200.8, 359/213.1–215.1, 223.1–225.1, 226.2
See application file for complete search history.

(56) References Cited

U.S. PATENT DOCUMENTS
2007/0035799 A1   2/2007   Gomi et al.

FOREIGN PATENT DOCUMENTS
JP   09-97305   4/1997

*Primary Examiner* — James Phan
(74) *Attorney, Agent, or Firm* — Harness, Dickey & Pierce, P.L.C.

(57) ABSTRACT

A mirror device drive control apparatus adapted to perform drive control of a mirror device having a hysteresis characteristic.

3 Claims, 5 Drawing Sheets

MIRROR DEVICE DRIVE CONTROL APPARATUS AND PROJECTOR

CROSS-REFERENCE TO RELATED APPLICATIONS

This is a continuation application of U.S. Ser. No. 12/749,549 filed Mar. 30, 2010, now U.S. Pat. No. 7,990,596, which claims priority to Japanese Patent Application Nos. 2009-088718 filed Apr. 1, 2009 and 2010-033236 filed Feb. 18, 2010, all of which are incorporated by reference herein in their entireties.

BACKGROUND

1. Technical Field

The present invention relates to a mirror device drive control apparatus for performing drive control of a mirror device and a projector.

2. Related Art

In the past, there has been known an optical scanner, which turns (rotates) a mirror device in a one-dimensional direction to thereby perform scanning of light (see, e.g., JP-A-9-97305).

The mirror device is obtained by forming, in a single plate, a mirror section provided with a reflecting surface for reflecting light, a pair of torsional vibration sections for supporting the mirror section from the both sides thereof, an outer frame surrounding the mirror section and the torsional vibration sections, and connection sections for connecting end sections of the pair of torsional vibration sections, which are opposite to the mirror section, to the outer frame.

Further, in such a mirror device, it is arranged that the mirror section is turned around a rotational axis connecting the connection points between the respective torsional vibration sections and the connection sections due to the torsional vibration of the pair of torsional vibration sections to thereby scan the light.

In the case of applying such a mirror device of the related art to, for example, a projector, if it is attempted to enlarge the field angle, it is required to enlarge the vibration amplitude (the deflection angle) when a movable section (the mirror section) of the mirror device deflects.

Therefore, when a state with the large deflection angle of the mirror section is set, and the drive control of the mirror device is performed in this state of setting, for example, it might run off from the setting due to a temperature variation. In this case, it is desired to achieve resetting in a short period of time.

SUMMARY

An advantage of some aspects of the invention is to provide a mirror device drive control apparatus and a projector allowing resetting of the deflection angle of the movable section to be achieved in a short period of time in the case in which the mirror device drive control apparatus and the projector are in use with the deflection angle of the movable section is set to be a predetermined value.

In order to achieve the advantage of the invention, respective aspects of the invention are configured as follows.

According to a first aspect of the invention, there is provided a mirror device drive control apparatus adapted to perform drive control of a mirror device having a hysteresis characteristic, including a drive section adapted to drive the mirror device with a drive signal, a detection section adapted to detect a displacement of a movable section of the mirror device, and to generate and then output a detection signal corresponding to the detection, a control section adapted to perform control of a frequency of the drive signal so that the movable section is displaced in a predetermined range, and an abnormality detection section adapted to detect abnormal vibration of the movable section during the control by the control section, wherein the abnormality detection section detects, in response to change in frequency of the drive signal, a frequency of an envelope included in the abnormal vibration of the movable section as a beat frequency based on a detection signal of the detection section, and obtains a frequency of the drive signal for performing a restoration process of driving of the mirror device based on the frequency of the drive signal changed and the beat frequency.

According to a second aspect of the invention, in the mirror device drive control apparatus of the first aspect of the invention, the abnormality detection section acquires the detection signal of the detection section a plurality of times at predetermined intervals immediately after the frequency of the drive signal is changed, obtains a frequency of an envelope included in the abnormal vibration of the movable section as a beat frequency based on the detection signal acquired the plurality of times, and obtains a frequency of the drive signal for performing a restoration process of driving of the mirror device based on the frequency of the drive signal changed and the beat frequency.

According to another aspect of the invention, there is provided a projector including a mirror device having a hysteresis characteristic, and the mirror device drive control apparatus according to the first or the second aspect of the invention adapted to perform drive control of the mirror device.

According to these aspects of the invention provided with the configuration described above, when the apparatus or the projector is used with the deflection angle of the movable section set to be a predetermined value, and then it runs off from the setting, resetting thereof can be achieved in a short period of time.

BRIEF DESCRIPTION OF THE DRAWINGS

The invention will be described with reference to the accompanying drawings, wherein like numbers reference like elements.

FIGS. 2A and 2B are diagrams showing a configuration example of the mirror device, wherein FIG. 2A is a plan view, and FIG. 2B is a cross-sectional diagram along the line A-A in FIG. 2A.

DESCRIPTION OF EXEMPLARY EMBODIMENTS

Some embodiments of the invention will hereinafter be explained with reference to the accompanying drawings.
Configuration of Apparatus FIG. 1 is a block diagram showing a configuration of a mirror device drive control apparatus according to an embodiment of the invention.

Figure 1:
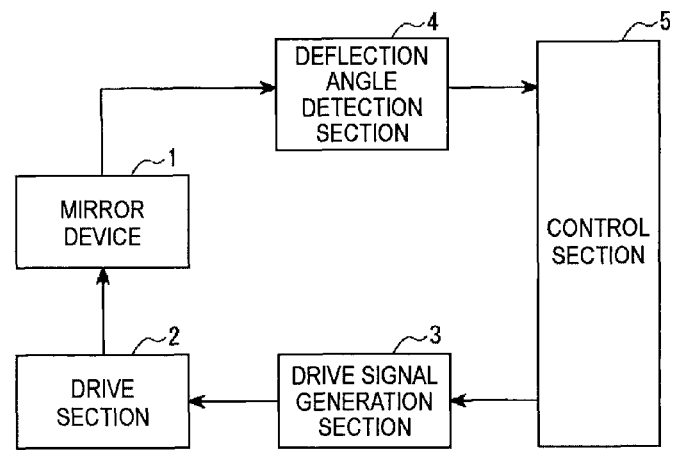
FIG. 1 is a block diagram showing a configuration of a mirror device drive control apparatus according to an embodiment of the invention.

The mirror device drive control apparatus according to the present embodiment is for performing drive control of a mirror device 1, and is provided with a drive section 2, a drive signal generation section 3, a deflection angle detection section (a vibration amplitude detection section) 4, and a control section 5 as shown in FIG. 1.

Figure 2A:
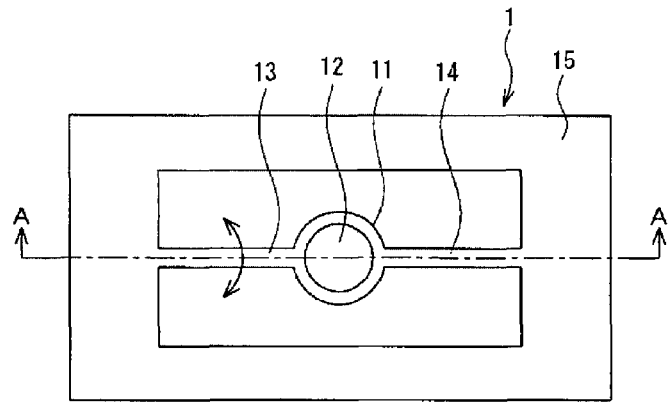
Figure 2B:
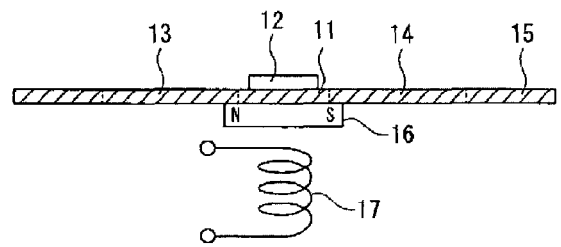

As shown in FIGS. 2A and 2B, the mirror device 1 has a frame 15, a movable section 11 movable with respect to the frame 15, and a torsion sections 13, 14 elastically deformable and for connecting the frame 15 and the movable section 11 to each other. The upper surface of the movable section 11 is provided with a mirror section 12 for reflecting light. The mirror section 12 is formed of a metal film made of, for example, Al or Ni. The both ends of the movable section 11 are connected to the frame 15 via the torsion sections 13, 14.

Further, the movable section 11, the torsion sections 13, 14, and the frame 15 are formed using, for example, silicon as a primary material, and the movable section 11, the torsion sections 13, 14, and the frame 15 are formed integrally. As described above, by using silicon as a primary material, a superior rotational characteristic can be achieved, and at the same time, superior durability can be exerted. Further, fine processing (work) can be executed on the silicon, thus downsizing of the mirror device 1 can be achieved.

Further, the lower surface of the movable section 11 is provided with a permanent magnet 16, and under the permanent magnet 16 there is disposed a coil 17. Further, it is arranged that by making an alternating current flow through the coil 17, the torsion sections 13, 14 turn in a direction perpendicular to a length direction thereof, and thus the movable section 11 and the mirror section 12 are deflected.

Figure 3:
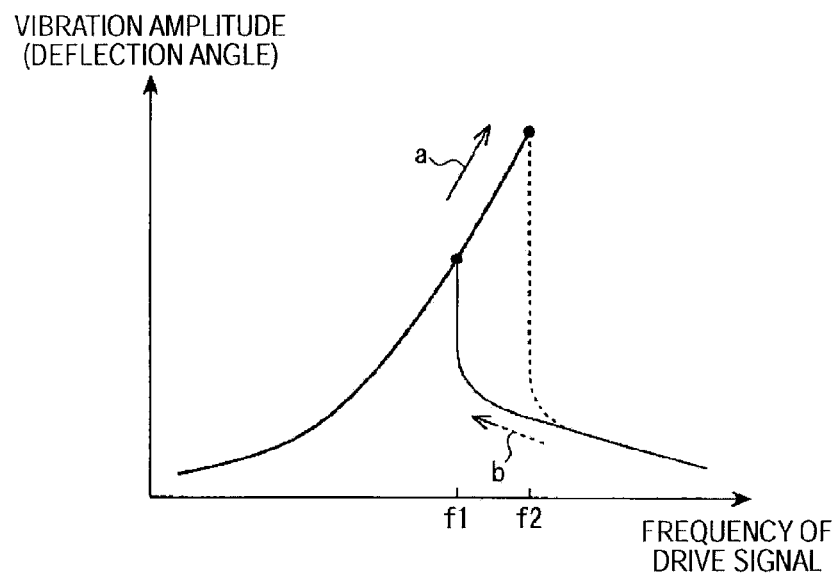
FIG. 3 is a diagram showing an example of a relationship between a drive frequency of the mirror device and vibration amplitude (a deflection angle) corresponding to a deflection of a movable section.

The mirror device 1 thus configured has a hysteresis characteristic as shown in FIG. 3. This point will be described later.

The drive section 2 drives the mirror device 1 based on a drive signal generated by the drive signal generation section 3. The drive signal generation section 3 generates the drive signal with a desired frequency in accordance with an instruction from the control section 5, and then outputs the drive signal thus generated to the drive section 2.

The deflection angle detection section 4 detects the vibration amplitude (the deflection angle or a displacement) corresponding to the deflection of the movable section 11 of the mirror device 1, in other words, the vibration amplitude corresponding to the deflection of the mirror section 12. The deflection angle detection section 4 is composed of, for example, a combination of a plurality of photodiodes (not shown), and is arranged to reflect the light from a light source (not shown) with the mirror section 12 of the mirror device 1, and then receive it with the photodiodes. Further, the deflection angle detection section is arranged to output a signal representing the vibration amplitude value corresponding to the deflection of the movable section 11 of the mirror device 1 based on the light received by the photodiodes.

Further, as another configuration of the deflection angle detection section 4, the following can be cited. Specifically, the deflection angle detection section 4 has a piezoresistive element (not shown) disposed on the torsion section 13 of the mirror device 1, a resistance value detection section (not shown) for detecting the resistance value of the piezoresistive element, and an angle detection section (not shown) for obtaining (detecting) the vibration amplitude corresponding to the deflection of the movable section 11 based on the detection result of the resistance value detection section. The piezoresistive element changes the resistance value thereof in accordance with the stress caused by torsional deformation of the torsion section 13 due to the turning of the movable section 11. When the piezoresistive element deforms from a natural state in which no external force is applied, the piezoresistive element shows a resistance value corresponding to an amount of the deformation. Therefore, the angle detection section obtains a degree of the torsion of the torsion section 13 based on the level of the resistance value detected by the resistance value detection section, further obtains the vibration amplitude corresponding to the deflection of the movable section 11 from the level of the torsion, and then outputs the signal representing the vibration amplitude value corresponding to the deflection.

The control section 5 performs the control process with a predetermined procedure during drive of the mirror device 1 as described later (see FIG. 5). Further, during the control process, detection (beat detection) of the abnormal vibration of the movable section 11 of the mirror device 1 is executed (see FIG. 6). Further, after the detection in the abnormal detection process, a restoration process shown in FIG. 7 is performed. For this reason, the control section 5 is provided with a CPU, a memory device, and so on although not shown in the drawings.

In the embodiment having the configuration described above, the control process described later is performed, and since the control process makes use of a novel knowledge as described below, this point will hereinafter be explained.

When driving the mirror device 1 shown in FIG. 2, the variation in the vibration amplitude (the deflection angle) corresponding to the deflection of the movable section 11 of the mirror device 1 with respect to the variation in the frequency of the drive signal has a hysteresis characteristic as shown in FIG. 3, for example. This is because a nonlinear effect of the spring due to the material or the structure of the mirror device 1 appears.

Therefore, when the frequency of the drive signal is raised gradually, the vibration amplitude of the movable section 11 of the mirror device 1 varies as indicated by the arrow "a," and the frequency of the drive signal with the maximum vibration amplitude becomes f2. In contrast, when the frequency of the drive signal is dropped gradually, the vibration amplitude of the movable section 11 of the mirror device 1 varies as indicated by the arrow "b," and the frequency of the drive signal with the maximum vibration amplitude becomes f1.

As described above, the frequency of the drive signal with the maximum vibration amplitude is different between the case in which the frequency of the drive signal is raised gradually and the case in which it is dropped gradually, namely f1 and f2 (f1<f2).

Incidentally, as shown in FIG. 3, in the case, for example, in which the frequency of the drive signal of the mirror device 1 is f2, and the mirror device 1 is in the state (a resonant state) in which the vibration amplitude of the movable section 11 is the maximum, the resonant state may run off from the frequency f2 of the drive signal in some cases due to the variation in environmental temperature around the mirror device 1. In this case, the abnormal vibration is caused in the movable section 11 of the mirror device 1, and in the abnormal vibration there is caused the state in which the vibration amplitude (the deflection angle) of the movable section 11 is changed rapidly to be smaller, and the beat is generated.

Figure 4:
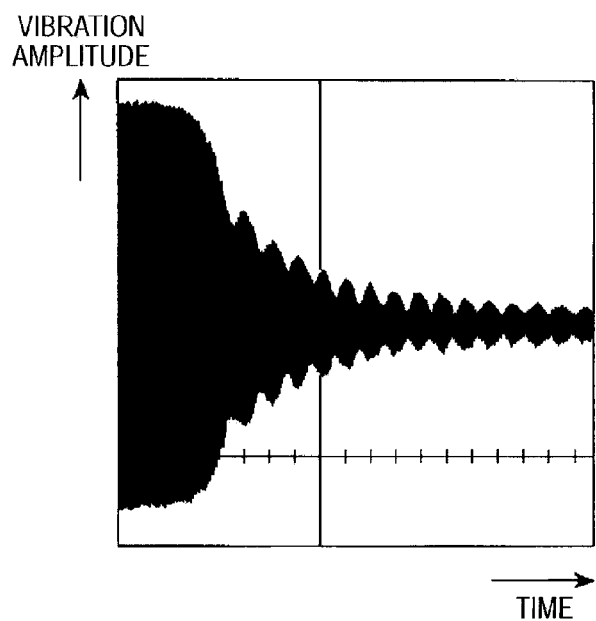
FIG. 4 is a waveform chart showing an example of a vibration waveform immediately after the movable section of the mirror device has generated abnormal vibration.

According to observation of the abnormal vibration of the movable section 11 of the mirror device 1, the vibration waveform shown in FIG. 4 is obtained, and the vibration waveform has the vibration amplitude rapidly decreasing, and includes an envelope corresponding to the beat.

Further, there is obtained the knowledge that assuming the frequency of the envelope as a beat frequency fb, the frequency of the drive signal when the beat is generated as f, the frequency of the drive signal with the maximum vibration amplitude (deflection angle) of the movable section 11 of the mirror device 1 when the frequency of the drive signal is gradually dropped from a high frequency as f1 (see FIG. 4), the formula 1 below is obtained.

$$fb \approx f - f1 \quad (1)$$

Further, by modifying the formula 1, the formula 2 can be obtained.

$$f1 \approx f - fb \quad (2)$$

Therefore, in the case of the embodiment of the invention, since the frequency f of the drive signal when the beat is generated has been known previously, if the frequency of the envelope included in the abnormal vibration of the movable section 11 of the mirror device 1 is obtained as the beat frequency fb, the frequency f1 can be obtained from the formula 2. Therefore, it is arranged that the frequency f1 thus obtained is utilized as described later.

Control Process

Figure 5:
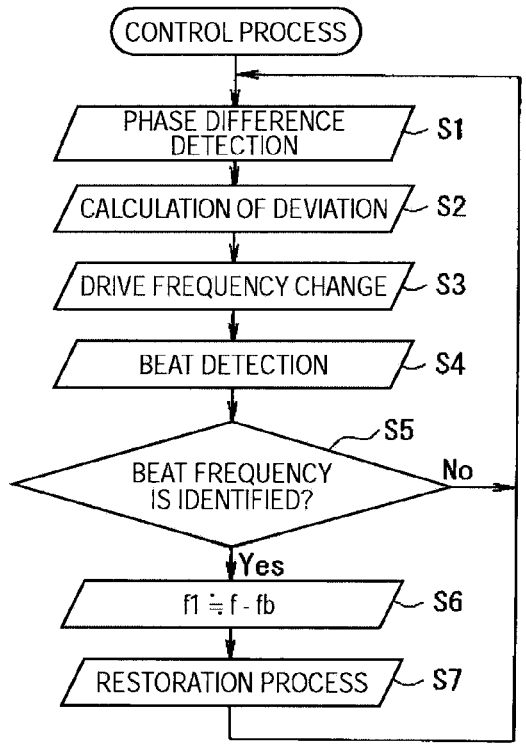
FIG. 5 is a flowchart showing an example of a control process of the mirror device.

FIG. 5 is a flowchart of an example of the control process performed by the control section 5.

The control process is for performing the drive control of the mirror device 1 so that the vibration amplitude (the deflection angle) takes a predetermined value corresponding to the deflection of the movable section 11 of the mirror device 1, and includes detection of the beat due to the abnormal vibration of the movable section 11 thereof.

Specific processing of the control process will be explained with reference to FIG. 5.

In the step S1 a predetermined phase difference between the drive signal with the present drive frequency of the mirror device 1 and the detection signal of the deflection angle detection section 4 is calculated based on the both signals.

In the step S2, a deviation of the phase difference thus calculated from the target value is obtained (calculated). In the step S3, the drive frequency of the drive signal of the mirror device 1 is changed in accordance with the deviation thus obtained. In accordance with the change of the drive frequency, the frequency of the drive signal generated by the drive signal generation section 3 is changed. Therefore, the drive section 2 drives the mirror device 1 with the drive signal having the frequency thus changed.

In the step S4, the beat detection is performed with a procedure shown in FIG. 6, and the rough outline thereof will be described below.

Specifically, the beat detection is performed based on the detection signal of the deflection angle detection section 4 immediately after the change of the drive frequency of the mirror device 1. In this case, if the abnormal vibration is caused in the movable section 11 of the mirror device 1, based on the detection signal of the deflection angle detection section 4, the frequency of the envelope included in the abnormal vibration is obtained as the beat frequency fb.

In the step S5, whether or not the beat frequency fb is identified is determined. As a result of the determination, if the beat frequency fb is not identified, the process returns to the step S1, and the process of the steps S1 through S4 is performed.

Subsequently, if it is determined in the step S5 that the beat frequency fb is identified, the process proceeds to the step S6 below. In the step S6, the frequency f1 is obtained from the formula 2 based on the drive frequency f when the beat frequency fb is obtained and the beat frequency fb, and the frequency f1 is set as a restoration start frequency. In the step S7, the restoration process shown in FIG. 7 is performed, which will be described later.

Beat Detection

Figure 6:
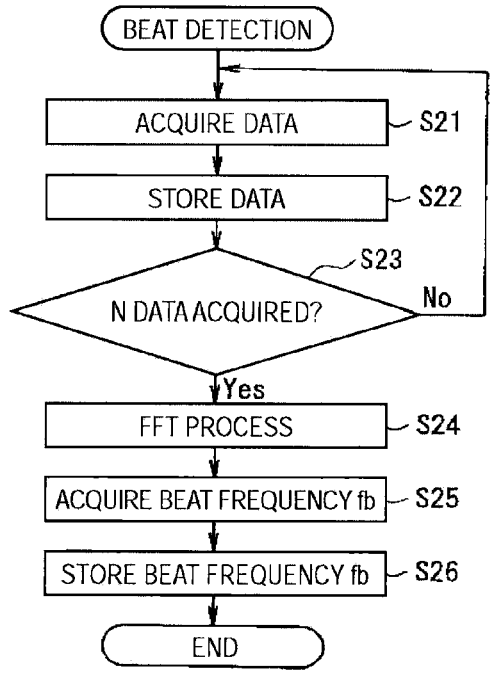
FIG. 6 is a flowchart showing an example of process of beat detection executed in the control process.
Figure 7:
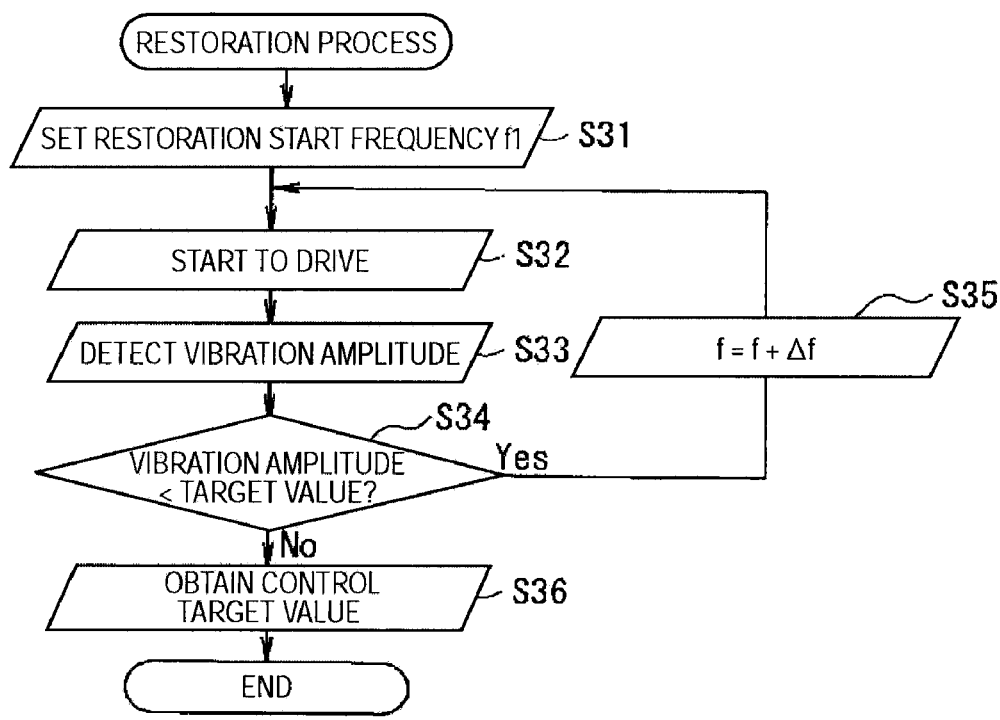
FIG. 7 is a flowchart showing an example of a restoration process for restoring the control process.

FIG. 6 is a flowchart of an example of the beat detection (abnormal detection) executed in the step S4 by the control section 5 during the control process.

The beat detection is performed immediately after increasing the frequency f of the drive signal of the mirror device 1 by a predetermined frequency Δf, and is composed of the following processing procedure.

In the step S21, based on the detection signal of the deflection angle detection section 4, acquisition of the data representing the vibration amplitude value corresponding to the deflection of the movable section 11 is started. In the step S22, the data thus acquired is stored (saved) in the memory. In the step S23, whether or not N data are acquired is determined.

According to a series of processes of the steps S21 through S23 described above, it is possible to acquire N data at predetermined time intervals based on the detection signal of the deflection angle detection section 4, and then to store the N data thus acquired in the memory.

After acquiring the N data by the series of processes of the steps S21 through S23, the process proceeds to the subsequent step S24. In the step S24, a fast Fourier transform (FFT) process is performed based on the N data thus acquired and representing the vibration amplitude values corresponding to the deflection of the movable section 11.

In the step S25, the beat frequency fb described above is obtained based on the FFT process in the step S24. In the step S26, the frequency f1 is obtained from the formula 2 based on the frequency f of the drive signal when the beat frequency fb is obtained and the beat frequency fb (see FIG. 6). In the step S26, the beat frequency fb thus obtained is stored (saved) in the memory.

Restoration Process

FIG. 7 is a flowchart of an example of the restoration process executed in the step S7 by the control section 5 during the control process.

The restoration process is a process performed for setting the frequency f1 thus calculated in the step S6 shown in FIG. 5 as the restoration start frequency, and starting to drive the mirror device 1 with the drive signal having the restoration start frequency, thereby restoring the drive control, and is composed of the following processing procedure.

In the step S31, the frequency f1 obtained in the step S6 is set as the frequency for starting the restoration of the mirror device 1. Thus, the drive signal generation section 3 generates the drive signal with the frequency f1 based on the instruction from the control section 5, and the drive section 2 starts to drive the mirror device 1 with the drive signal (step S32).

In the step S33, the vibration amplitude of the movable section 11 of the mirror device 1 is detected based on the detection signal of the deflection angle detection section 4. In the step S34, whether or not the vibration amplitude thus detected reaches the target value is determined. As a result of the determination, if the vibration amplitude thus detected does not reach the target value, the process proceeds to the subsequent step S35.

In the step S35, the frequency f of the drive signal of the mirror device 1 is increased by the predetermined frequency Δf, and then the process returns to the step S32. In the step S32, the mirror device 1 is driven with the drive signal having the new frequency (f=f+Δf), and then the processes of the steps S33, S34 are performed.

Further, if it is determined in the step S34 that the vibration amplitude thus detected has reached the target value while repeating the series of processes of the steps S32 through S35, the process proceeds to the subsequent step S36. In the step S36, a control target value is obtained based on the vibration amplitude thus detected.

After the restoration process has been completed as described above, the process proceeds to the step S1 shown in FIG. 5, and then the process shown in FIG. 5 is started.

As described above, in the control process of the embodiment (see FIG. 5), it is arranged that the abnormal vibration detection (the beat detection) of the movable section 11 of the mirror device 1 is performed during the drive control of the mirror device 1. Further, it is arranged that when the beat frequency is identified in the beat detection, the start frequency f1 of the restoration process shown in FIG. 7 is obtained based on the beat frequency and so on, and then the restoration process is started with the start frequency f1.

Here, in the case in which the start frequency f1 of the restoration process described above is not available, it is required to set the start frequency of the restoration process to be a frequency (e.g., a frequency 2 through 3% lower than the frequency f1) far lower than the frequency f1 due to the drive frequency hysteresis of the mirror device 1 (see FIG. 3).

However, in the present embodiment, since the frequency of the restoration process can be set to be f1, the time required for the restoration process can be shortened.

Other Embodiments

1. In the embodiment described above the beat frequency fb is obtained in the beat detection of the step S4 shown in FIG. 5, and an example of the method of obtaining the beat frequency fb is explained with reference to FIG. 6. However, the method of obtaining the beat frequency fb is not limited to what is shown in FIG. 6.

2. Although in the embodiment described above it is arranged that the restoration process shown in FIG. 7 is started with the frequency f1, it is also possible to arrange that it is started with a frequency lower than the frequency f1 in order for reliably performing the process. In this case, it is preferable that the frequency with which the restoration process is started is set to be a frequency roughly 0.01 through 0.1% lower than the frequency f1, for example.

3. Although in the embodiment described above the case in which the object of the drive control is a mirror device is explained, the invention can be applied to any device having a drive frequency hysteresis characteristic and requiring the control process described above.

Projector According to Embodiment

A projector according to an embodiment of the invention includes the mirror device drive control apparatus according to the embodiment described above and the mirror device, and the embodiment described later includes two pairs of mirror device drive control apparatus and mirror device. The mirror device drive control apparatus according to the embodiment described above is best suitable particularly for small-sized projectors, and exerts the advantages described above.

It should be noted that the mirror device drive control apparatus according to the embodiment described above can also be applied to scanners besides the projectors.

Hereinafter, the projector according to the embodiment of the invention will be explained with reference to the accompanying drawings.

Figure 8:
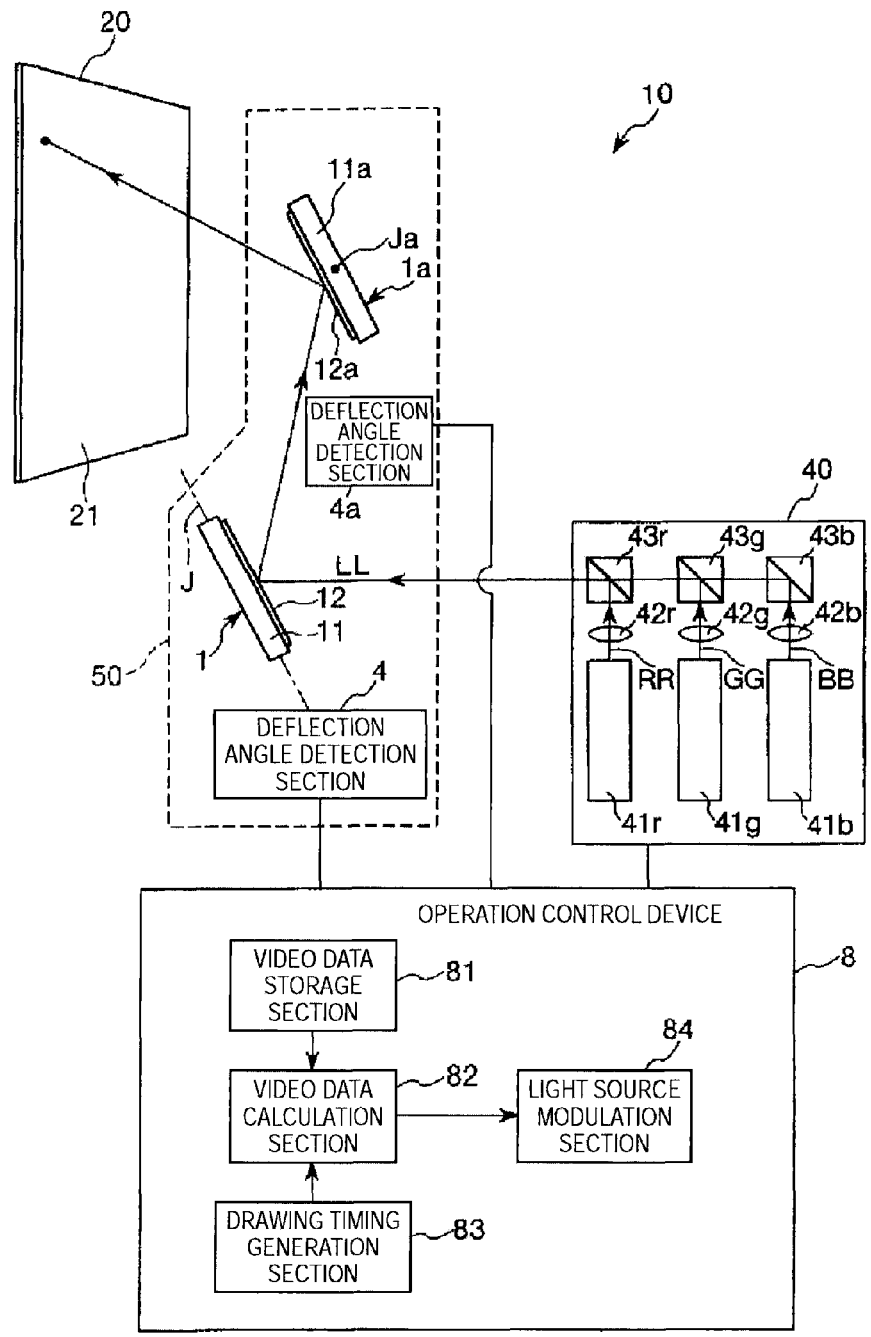
FIG. 8 is a diagram showing a configuration of a projector according to an embodiment of the invention.

FIG. 8 is a diagram showing a configuration of a projector according to the embodiment of the invention.

As shown in FIG. 8, the projector 10 is a projection image forming apparatus for scanning light on an object such as a screen 20 to thereby form (draw, project) images (videos).

A surface of the screen 20 on the projector 10 side constitutes a light scan surface on which the projector 10 scans the light, namely a projection surface 21. By the projector 10 scanning the light, predetermined images such as still images and moving images are drawn on the projection surface 21. By using such a screen 20, the visibility of the images can be enhanced.

A constituent material of the screen 20 is not particularly limited, and for example, polyethylene, polypropylene, polyvinyl chloride, polystyrene, polyamide, acrylic resin, ABS resin, fluorinated resin, epoxy resin, silicone resin, a copolymer, a polymer blend, a polymer alloy having any one of these compounds as a primary constituent, and so on can be cited, and one of these compounds can be used alone or two or more of these compounds can also be used in combination.

Then, the projector 10 will hereinafter be explained.

As shown in FIG. 8, the projector 10 has a light source unit (a light emitting section) 40 for emitting light, a light scanning section 50 for scanning the light emitted to the projection surface 21 from the light source unit 40, and an operation control device (a control section) 8 for controlling operations (drive) of the light source unit 40 and the light scanning section 50.

The light source unit 40 is provided with a red laser source 41r, a green laser source 41g, a blue laser source 41b, and collimator lenses 42r, 42g, 42b and dichroic mirrors 43r, 43g, 43b disposed correspondingly to the laser sources 41r, 41g, 41b of the respective colors.

The laser sources 41r, 41g, 41b of the respective colors have a red light source and a drive circuit for driving the light source, a green light source and a drive circuit for driving the light source, and a blue light source and a drive circuit for driving the light source, and emit red, green, blue laser beams RR, GG, BB, respectively. The laser beams RR, GG, BB are emitted in the condition of being modulated in accordance with a drive signal transmitted from a light source modulation section 84 of the operation control device 8 described later, and then respectively collimated by the collimator lenses 42r, 42g, 42b as collimating optical elements to be formed as fine beams.

The dichroic mirrors 43r, 43g, 43b have properties of reflecting the red laser beam RR, the green laser beam GG, and the blue laser beam BB, respectively, and combine the laser beams RR, GG, BB of the respective colors with each other to emit a single laser beam (light) LL.

It should be noted that a collimator mirror can be used instead of the collimator lenses 42r, 42g, 42b, and also in this case, fine collimated light beams can be formed. Further, in the case in which the collimated light beams are emitted from the laser sources 41r, 41g, 41b of the respective colors, the collimator lenses 42r, 42g, 42b can be eliminated. Further, the laser sources 41r, 41g, 41b can be replaced with light sources such as light emitting diodes for generating similar light beams. Further, the order of the laser sources 41r, 41g, 41b, the collimator lenses 42r, 42g, 42b, and the dichroic mirrors 43r, 43g, 43b of the respective colors shown in FIG. 8 is nothing more than an example, and the order can be set freely while keeping the combinations (the laser source 41r, the collimator lens 42r, and the dichroic mirror 43r are for red, the laser source 41g, the collimator lens 42g, and the dichroic mirror 43g are for green, and the laser source 41b, the collimator lens 42b, and the dichroic mirror 43b are for blue) of the respective colors.

Further, the light scanning section 50 is for scanning the laser beam LL emitted from the light source unit 40 on the projection surface 21 two-dimensionally by scanning (horizontal scan or primary scan) it in a horizontal direction (a first direction) while scanning (vertical scan or secondary scan) it in a vertical direction (a second direction perpendicular to a first direction) at a scan rate lower than that in the horizontal direction. The light scanning section 50 has the mirror device (a first direction scanning section) 1 described above as a horizontal scanning mirror for scanning the laser beam LL emitted from the light source unit 40 on the projection surface 21 in the horizontal direction, and a mirror device (a second direction scanning section) 1a as a vertical scanning mirror for scanning the laser beam LL emitted from the light source unit 40 on the projection surface 21 in the vertical direction. It should be noted that since the mirror device 1a is substantially the same as the mirror device 1 described above, the explanation therefor will be omitted.

Further, the mirror device 1 and the mirror device 1a are disposed so that the rotational center axes J, Ja become perpendicular to each other. By disposing the mirror device 1 and the mirror device 1a in such a manner as described above, it is possible to scan the laser beam LL emitted from the light source unit 40 on the projection surface 21 two-dimensionally (in two directions perpendicular to each other). Thus, it becomes possible to draw a two-dimensional image on the projection surface 21 with a relatively simple configuration.

Further, the light scanning section 50 includes the drive section 2, the drive signal generation section 3, the deflection angle detection section 4 (4a) of each of the mirror device drive control apparatuses for performing drive control of the mirror device 1 and the mirror device 1a, respectively.

Further, the operation control device 8 has a video data storage section (a video data storing section) 81 for storing video data (image data) used when drawing the image, a video data calculation section 82, a drawing timing generation section 83, and a light source modulation section (a light modulation section) 84.

Further, the operation control device 8 includes a control section 5 of each of the mirror device drive control apparatuses for performing drive control of the mirror device 1 and the mirror device 1a, respectively.

When drawing an image on the projection surface 21 of the screen 20, video data is firstly input to the projector 10. The video data thus input is temporarily stored in the video data storage section 81 of the operation control device 8, then retrieved from the video data storage section 81, and the image is drawn using the video data.

Further, the drawing timing generation section 83 generates drawing timing information including information of timing at which the drawing is performed, and the drawing timing information is transmitted to the video data calculation section 82.

The video data calculation section 82 retrieves the video data corresponding to pixels to be drawn from the video data storage section 81 based on the drawing timing information input from the drawing timing generation section 83, then performs various correction calculation, and then transmits brightness data of the respective colors to the light source modulation section 84.

The light source modulation section 84 performs modulation of the laser sources 41r, 41g, 41b of the respective colors based on the brightness data of the respective colors input from the video data calculation section 82. Specifically, the light source modulation section 84 performs putting on/off, control (increase and decrease) the output, and so on of the laser sources 41r, 41g, 41b of the respective colors.

The laser beam LL thus emitted from the light source unit 40 is reflected by the mirror section 12 of the mirror device 1, subsequently reflected by the mirror section 12a of the mirror device 1a, and then projected (emitted) on the projection surface 21 of the screen 20. Further, by turning the movable section 11 at a first angular velocity and (at the same time) turning the movable section 11a at a second angular velocity lower than the first angular velocity under the control of the operation control section 8, the laser beam LL is scanned on the projection surface 21 in the horizontal direction and (at the same time) scanned in the vertical direction at a scanning rate lower than the scanning rate in the horizontal direction. Thus, the laser beam LL emitted from the light source unit 40 is two-dimensionally scanned on the projection surface 21, and the image is drawn on the projection surface 21.

It should be noted that it is also possible to arrange that the light emitted from the light source unit 40 is firstly reflected by the mirror section 12a of the mirror device 1a, and is then reflected by the mirror section 12 of the mirror device 1. In other words, it is also possible to have a configuration of performing the vertical scanning first, and then performing the horizontal scanning.

Although the mirror device drive control apparatus and the projector according to the embodiments of the invention are explained based on the embodiments shown in the accompanying drawings, the invention is not limited to these embodiments, but the configuration of each of the components can be replaced with any configuration having an identical function. Further, it is possible to add any other constituents to the invention.

Further, although in the embodiments described above two sets of mirror device drive control apparatus according to the invention and the mirror device (an actuator having a configuration on which resonant drive is performed) are used as the light scanning section of the projector, the invention is not limited thereto, and it is also possible to replace one of the two sets with a galvanometer mirror, for example.

Further, in the invention, it is also possible for the mirror device drive control apparatus to include the mirror device as a constituent thereof.

What is claimed is:

1. A mirror device drive control apparatus adapted to perform drive control of a mirror device having a hysteresis characteristic, comprising:
    a control section configured to perform control of a frequency of a drive signal of the mirror device;
    an abnormality detection section configured to detect abnormal vibration of a movable section of the mirror device based on a detection signal of a detection section detecting a variation in a displacement of the movable section; and
    wherein the abnormality detection section detects, in response to change in frequency of the drive signal, a frequency of an envelope included in a waveform of the abnormal vibration of the movable section, and obtains a frequency of the drive signal for performing a restoration process of driving of the mirror device based on the frequency of the drive signal changed and the frequency of the envelope.

2. The mirror device drive control apparatus according to claim 1,
wherein the abnormality detection section acquires the detection signal of the detection section a plurality of times at predetermined intervals immediately after the frequency of the drive signal is changed, obtains a frequency of an envelope included in the waveform of the abnormal vibration of the movable section based on the detection signal of the detection signal acquired the plurality of times, and obtains a frequency of the drive signal for performing a restoration process of driving of the mirror device based on the frequency of the drive signal changed and the frequency of the envelope.

3. A projector comprising:
a mirror device having a hysteresis characteristic;
a drive section configured to drive the mirror device with a drive signal;
a detection section configured to detect a displacement of a movable section of the mirror device, and to output a detection signal corresponding to the detection; and
the mirror device drive control apparatus according to claim 1 configured to perform drive control of the mirror device.

* * * * *